US008706918B2

(12) United States Patent  (10) Patent No.: US 8,706,918 B2
Fried et al.  (45) Date of Patent: *Apr. 22, 2014

(54) EXTERNAL ENVIRONMENT SENSITIVE PREDICTIVE APPLICATION AND MEMORY INITIATION

(75) Inventors: Eric P. Fried, Austin, TX (US); Willaim B. Huber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 13/297,173

(22) Filed: Nov. 15, 2011

(65) Prior Publication Data

US 2013/0124847 A1 May 16, 2013

(51) Int. Cl.
*G06F 9/06* (2006.01)

(52) U.S. Cl.
USPC .............. 710/6; 710/15; 713/1; 713/300

(58) Field of Classification Search
None
See application file for complete search history.

(56) References Cited

U.S. PATENT DOCUMENTS

| 5,983,186 | A  | * | 11/1999 | Miyazawa et al. ............ 704/275 |
| 7,716,332 | B1 |   | 5/2010  | Topfl et al. |
| 8,176,437 | B1 | * | 5/2012  | Taubman ...................... 715/810 |
| 2002/0114519 | A1 | * | 8/2002 | Mastrianni et al. ........... 382/199 |
| 2004/0225654 | A1 |   | 11/2004 | Banavar et al. |
| 2005/0213242 | A1 | * | 9/2005 | Fujiki et al. .................... 360/75 |
| 2006/0156209 | A1 | * | 7/2006 | Matsuura et al. ............. 714/798 |
| 2009/0184849 | A1 | * | 7/2009 | Nasiri et al. .................... 341/20 |
| 2009/0307693 | A1 |   | 12/2009 | Do et al. |
| 2011/0066733 | A1 |   | 3/2011 | Hashimoto et al. |
| 2011/0306304 | A1 | * | 12/2011 | Forutanpour et al. ...... 455/67.11 |

FOREIGN PATENT DOCUMENTS

FR 2952201 A1 5/2011
WO WO 2011043762 A1 4/2011

OTHER PUBLICATIONS

Addison Chan et al, "A hybrid motion prediction method for caching and prefetching in distributed virtual environments", 2001.

* cited by examiner

*Primary Examiner* — Ilwoo Park
(74) *Attorney, Agent, or Firm* — Terrile, Cannatti, Chambers & Holland, LLP; Robert W. Holland

(57) ABSTRACT

An input tracker learns relationships between end user inputs made at a computer and external environment conditions sensed at the computer by external environment sensors integrated in the computer, such as a camera, microphone, hard disk drive motion detector, display ambient light sensor and display orientation accelerometer. An input predictor interfaced with the input tracker applies current external environment conditions sensed by the external environment sensors to the relationships defined by the input tracker to predict future user input and initiates actions by the computer responsive to the predicted future user input before the input is detected to have results responsive to the input prepared for the user upon detection of the input.

4 Claims, 2 Drawing Sheets

| Input | None | Log-in, Email Browser, Music | Word Processing; Meeting Notes |
|---|---|---|---|
| Time | 04:30 | 08:30 | 10:30 |

| External Action | Janitor | Work Day Starts | Walk to Meeting |
| Sensed External Condtion | Vacuum Light | Key, Door Noise; Light; Facial Image | Accelerations; Light; Group Voices; GPS |

EXTERNAL ENVIRONMENT SENSITIVE PREDICTIVE APPLICATION AND MEMORY INITIATION

BACKGROUND OF THE INVENTION

1. Field of the Invention

The present invention relates in general to the field of computer operations, and more particularly to an external environment sensitive predictive application and memory initiation.

2. Description of the Related Art

Computers save people time. Word processing is an example of this. Documents that used to take teams of secretaries to prepare are now readily stored in memory, retrieved and modified as needed by the end user of the document. Networking is another example of this. Email has replaced many mail communications through the post and social networking websites allow nearly instant personal updates to circulate among friends. Access to networked information enhances many common tasks, such as by providing employees with ready access to business resources and by providing students with ready access to educational materials. End users interact with computers through I/O devices, such as a keyboard, a mouse and a touchscreen. Computers also include a number of sensors that sense external environment factors for use by components and by an end user, such as a camera that captures images, a microphone that captures audible sounds, a seismic/gyroscopic sensor that captures motion to protect a hard disk drive, accelerometers that capture orientation for aligning a display, a GPS sensor that captures positioning information and an ambient light sensor that senses ambient light to adjust the brightness of a display screen.

While computers save time in the big picture, often computers seem to eat time when preparing to perform tasks requested by an end user with an I/O device. Consider the employee who sits at his desk at the beginning of a day. First the employee wiggles the computer mouse or presses a key at the keyboard to remove the screen saver or wake the computer from a sleep state. Next the employee inputs a password and then requests the email client to display the day's emails. Between each interaction, the computer churns information to accomplish the requested task by swapping in appropriate bits to display requested information, process inputs, start applications and page requested information to volatile memory accessible by the processor. Additional delays are sometimes introduced when the computer downloads requested information from a network while the information is communicated from a server.

SUMMARY OF THE INVENTION

Therefore, a computer system and method of use provides more rapid computer response times by learning relationships between end user inputs and sensed external environment conditions and then applying the relationships to predict and prepare for end user requests at I/O devices.

More specifically, an input tracker running on processing resources of a computer tracks the relationships between end user inputs to the computer and external environment conditions sensed by external environment sensors disposed in the computer, such as images captured by a camera, sounds captured by a microphone, motion detected by a hard disk drive motion detector, motion detected by display orientation accelerometer and other sensors. An input predictor analyzes current external environment conditions sensed by the external environment sensors and compares the current external environment conditions with stored environment conditions to predict end user inputs at the computer system. The input predictor responds to a predicted end user input by preparing actions responsive to the input, such as initiating an application and retrieving content from non-volatile storage to volatile storage for access by a processor. When the predicted input is actually detected, the computer responds to the input with improved speed since actions responsive to the input have already been performed in response to the prediction of the input.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figures 1, 2:
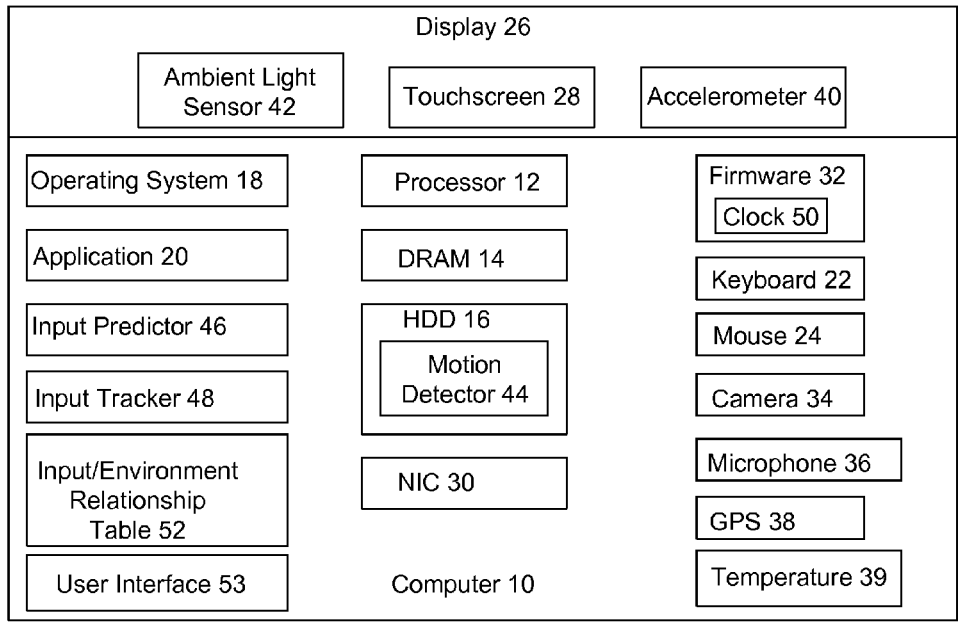
FIG. 1 depicts a block diagram of a computer configured to predict end user inputs and to prepare actions responsive to the predicted input before the input is detected.
FIG. 2 depicts a time line of exemplary external environment conditions and associated actions that are related to predict future inputs at a computer.

A computer predicts end user inputs so that results are presented for the inputs in reduced time once the user makes the inputs. In a learning mode, the computer records and stores a moving window or external environment conditions sensed at the computer, such as light, sounds, motions and images sensed during one minute sample periods. The sensed external environment conditions are distilled and indexed to generate a fingerprint of external conditions during a time period, such as minute intervals through a work week. The fingerprint may be generated on the fly or on demand when an action occurs for association with the environment conditions. When an action is performed on the computer, such as with an input made to an input device of the computer, the action is encoded and associated with the environment condition fingerprint sensed at the time of the action. In an act mode, the computer records a moving window worth of environment conditions and generates a fingerprint for current environment conditions, such as light, sounds, motions and images sensed at a time of the day and day of the week. The computer compares the current fingerprint with the stored fingerprints of external conditions to determine if a match exists. If a match between current and stored external conditions exists, the computer retrieves the action associated with the matching stored external conditions and predicts that the action will be initiated at the computer. In response to the predicted action, the computer prepares for the action, such as by prefetching memory pages for the application or applications associated with the action. Preparing for the input by retrieving stored information and executing instructions reduces the time need to respond to an end user input for the action when the action is detected.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a block diagram depicts a computer 10 configured to predict end user inputs and to prepare actions responsive to a predicted input before the input is detected at an input device. Computer 10 processes information by executing instructions with a processor 12. Instructions and other information that support processor operations are stored in volatile memory, such as dynamic random access memory (RAM) 14. A hard disk drive 16 or other non-volatile memory stores information during powered down states so that processor 12 can retrieve the information to RAM 14 for execution when processor 12 powers up. During normal operations, an operating system 18 manages the execution of applications 20 to perform tasks commanded by an end user through input devices, such as a keyboard 22 and mouse 24. The results of the commanded tasks are presented at a display 26, which may also include a touchscreen input device 28. In some instances, an application 20 performs communication with an external network through a network interface card (NIC) 30, such as an Ethernet or wireless network communication interface. Examples of applications 20 that use network communications include web browsing and e-mail.

Firmware 32 coordinates on a physical level the interactions between processor 12, RAM 14, hard disk drive 16, keyboard 22, mouse 24, display 26 and NIC 30. Firmware 32 is, for example, a chipset having an embedded controller, keyboard controller and/or other processing resources that execute instructions stored in non-volatile flash memory. Firmware 32 also coordinates interfaces between processor 12 and a variety of external environment sensors so that external environment conditions may be used by applications 20 running on processor 12. For example, a camera 34 captures images and a microphone 36 captures sounds for use by a video conferencing application. Other types of external environment sensors that sense external environment conditions at computer 10 include: a Global Positioning System (GPS) 38 that detects current position, a temperature sensor 39 that senses thermal conditions, an orientation accelerometer 40 that detects orientation of display 26 to display information upright relative to gravity, an ambient light sensor 42 that detects ambient light to adjust the brightness of display 26, and a motion detector 44 integrated in hard disk drive 16 to protect hard disk drive 16 from impact shock damage, such as a seismic/gyroscopic detector.

In order to minimize delays associated with user inputs made at input devices keyboard 22 and mouse 24, an input predictor 46 monitors external environmental conditions to predict future inputs and initiates actions at computer 10 that improve the response time of computer 10 if the predicted input is actually made. For example, delay between a user input and a computer response may be introduced by retrieval of information from non-volatile memory of hard disk drive 16 to volatile memory of RAM 14 for use by processor 12, such as retrieval of instructions to execute an application 20 or retrieval of content for presentation by an application 20. Input predictor 46 reduces such delays by initiating applications and/or retrieval of information responsive to a predicted input before the predicted input is made by an end user. Input predictor 46 predicts future end user inputs by monitoring external environment conditions detected by external environment sensors, such as camera 34, microphone 36, GPS 38, temperature sensor 39, accelerometer 40, ambient light sensor 42 and motion detector 44. If external environment conditions are detected that indicate a predetermined end user input will be initiated, then input predictor 46 predicts the input and initiates actions to reduce delay should the predicted input be detected at an input device.

Input predictor 46 bases predictions of future inputs on historical data gathered by an input tracker 48 during monitoring of normal use of computer 10 by an end user. For example, input tracker 48 samples external environment conditions detected by the external environment sensors over defined time periods. In one example embodiment, input tracker 48 references clock 50 to sample external environment conditions in one minute samples over the course of a normal work week to identify patterns of external conditions associated with inputs made to input devices. The samples and/or the patterns are stored in an input/environment relationship table 52 that is accessible by input predictor 46. Input predictor 46 accesses input/environment relationship table 52 to compare currently detected external environment conditions with historical patterns and, if current conditions match a historical pattern, then input predictor 46 predicts an input associated with the matching historical pattern. Based upon the predicted future input, input predictor 46 initiates actions at computer 10 to prepare for the input, such as retrieving and activating one or more applications and retrieving content to prepare the content for presentation at display 26. In one embodiment, input predictor prepares for the future input but withholds presentation of information for the predicted input until the actual input is received. Withholding output generated based upon a predicted input reduces end user annoyance at unwanted automated actions and provides a near instantaneous response when the predicted input is made. In one embodiment, a user interface 53 interacts with input/environment relationship table 52 so that an end user can set fingerprints of predicted actions based upon external environment conditions or alter predictions made by input predictor 46.

Input predictor 46, input tracker 48 and input/environment table 52 may be performed by an application running on processor 12, by instructions running as firmware 32 or a combination of processing resources. In one example embodiment, input predictor 46 runs as firmware 32 while processor 12 is powered down, such as in a sleep or hibernate state. Input predictor 46 provides power to one or more of the external environment sensors to detect external environment conditions predictive of initiation of an on state from the sleep or hibernate state. For instance, an increase in light that indicates a user has entered the room or the sound of keys opening a door at the start of a business day match external conditions associated with a power up input and request for email. In response to such external conditions, input predictor 46 running in firmware 32 initiates a power up of computer 10 and calls the email application to present email at display 26. During the sleep or hibernate state, input tracker 48 runs in firmware 32 to track sensed external environment conditions and store the conditions in input/environment relationships table 52. Once computer 10 enters the on state, input predictor 46 initiates as an application running on processor 12 to analyze the sensed environment conditions stored during the powered down state. In one embodiment, input predictor 46 looks for patterns that associate external environment conditions with inputs by running a neural network or other predictive algorithms during idle time of processor 12. In one alternative embodiment, input predictor 46 acts to prevent automated actions by computer 10 where the automated actions would be countered by a predicted input. For example, input predictor 46 counters an automated transition to a powered down state if camera 34 detects a user image and detection of the image indicates the user would make an input in response to the powered down state that would counter the powered down state, such as a mouse or keyboard input to bring computer 10 back to an on state.

During normal operations, input predictor 46 samples external environment conditions sensed by camera 34, microphone 36, GPS 38, accelerometer 40, ambient light sensor 42 and motion detector 44 to detect external environment conditions that match those associated with an end user input stored in input/environment relationship table 52. Input tracker 48 learns external conditions associated with end user inputs by storing a moving window of sensed external environment conditions and associating user input device inputs with the sensed external environment conditions. For example, minute long samples of external environment conditions are saved when an input is made by an end user and associated with the input. Input predictor 46 monitors external environment conditions in a similar moving window, such as minute long increments, and compares the currently sensed external environment conditions with historical conditions to identify a match. If a match exists between current and historical external environment conditions, input predictor 46 predicts the input associated with the matched external environment conditions and initiates actions at computer 10 to meet the requirements of the predicted input. In one embodiment, input predictor saves information at an address of non-volatile storage hard disk drive 16 to retrieve information for a predicted input, such as a script of one or more applications to run, content to retrieve, or executable code retrievable for execution by processor 12 that will result in the state associated with a predicted input being achieved at computer 10 without having to execute all instructions normally required by the input.

Referring now to FIG. 2, a time line depicts exemplary external environment conditions and associated actions that are related to predict future inputs at a computer. At 4 A.M., a janitor cleaning an office where computer 10 is located turns on a light that is detected by camera 34 and ambient light sensor 42, and runs a vacuum that generates noise detected by microphone 36. Since no inputs are detected at input devices of computer 10, no actions are associated with the janitor's external environment conditions. In one embodiment, the janitor's conditions are too remote to any inputs and are therefore not tracked in input/environment relationship table 52.

At 8:30 A.M., the employee assigned to the office arrives at work, opens the door with his keys, turns on the lights, approaches the computer and moves the mouse to bring up a login page. Next the employee inputs his password and opens an email application to check email, a web browser to check news and a music application to play Chopin's Fantasy Impromptu. Input tracker 48 detects the key sound with microphone 36, the light with camera 34, and an image of the end user with camera 34, and associates these detected environmental conditions during a time frame around 8:30 A.M. with the inputs for bringing up the login page and retrieving email, news and music. The relationship between the sensed environment conditions and the inputs are stored in input/environment relationship table 52 and made available to input predictor 46 for use the next morning. On the next morning, when input detector 46 detects the sound of keys and the lights at around 8:30 A.M., it predicts a login and retrieval of email, web browsing news and music. In response to the predicted inputs, input predictor 46 immediately initiates presentation of the login page as if the end user had already touched the mouse, and initiates the email, web browsing and music activities. By the time the end user has completed login, email, web browsing and music are loaded into volatile memory so that each input by the end user is met with near instantaneous response.

At 10:30 A.M., the employee picks up the computer and walks to a meeting. At the meeting, the employee opens a word processing document called "meeting notes." Input tracker 48 senses accelerations associated with walking with computer 10 by display orientation accelerometer 40 and hard disk drive motion detector 44, as well as lighting changes that occur during the walk, such as a walk across a courtyard in daylight. The position of computer 10 is sensed as changing by GPS 38. Input tracker 48 associates the sensed external environment conditions at 10:30 A.M. with the word processing document used at the meeting and defines the relationship in the input/environment relationships table 52. The next day at around 10:30 A.M., input predictor 46 senses the motion, light and GPS environment conditions with the external environment sensors and finds the match of external environment conditions in input/environment relationship table 52. Based on the match between current external environment conditions and the historical conditions stored in table 52, input predictor 46 predicts the input to start the word processing program and to retrieve the "meeting notes" content. In response to the predicted inputs, input predictor 46 initiates the word processing application and retrieves "meeting notes" from hard disk drive 16 to RAM 14, but withholds presentation of the word processing application and "meeting notes" document until the end user makes the predicted inputs. In alternative embodiments, alternative inputs may be predicted based upon alternative external environment conditions and the time frame in which the conditions occur. End users may manually set conditions that will predict actions or may manually remove predicted actions from input/environment relationship table 52.

Figure 3:
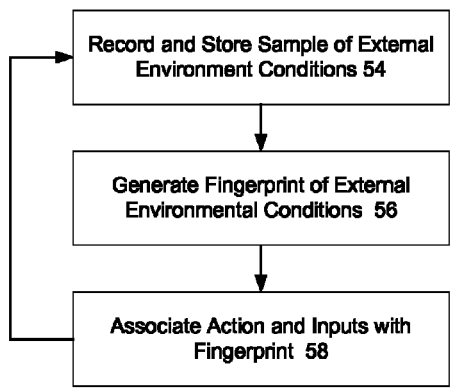
FIG. 3 depicts a flow diagram of a process for learning relationships between external environment conditions and inputs at a computer.

Referring now to FIG. 3, a flow diagram depicts a process for learning relationships between external environment conditions and inputs at a computer. At step 54, the computer stores a moving window, such as one minute increments, worth of external environment conditions detected with sensors of the computer, such light, audio and motion conditions. At step 56, the external environment conditions are processed to distill identifiable features of each condition and indexed to generate a fingerprint. The fingerprint is generated on the fly or on demand when inputs are detected at input devices of the computer when a relationship is defined that associates external environment conditions with an input. The type of information distilled from the external environment sensors can include general values, such as light intensity or noise loudness, or more specific values, such as a facial image or voice tone. At step 58, when an action is performed at the computer by an end user input, the action is encoded and associated with the fingerprint detected at the time of the action. The process then returns to step 54 to continue learning about the environment. During idle times at the computer, analysis may be performed by the computer processor on the saved fingerprints to identify patterns of external environment conditions and inputs where predictive responses will improve computer response time.

Figure 4:
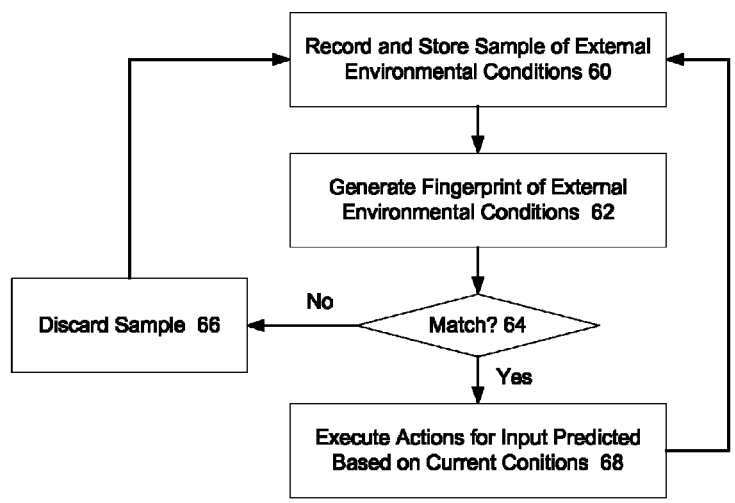
FIG. 4 depicts a flow diagram of a process for predicting inputs at a computer in response to current external environment conditions sensed at the computer.

Referring now to FIG. 4, a flow diagram depicts a process for predicting inputs at a computer in response to current external environment conditions sensed at the computer. At step 60, the computer records a moving window of sensed external environment conditions in a manner that will allow a comparison with historical external environment conditions, such as using the same one minute increments. At step 62, a fingerprint is generated that will allow a comparison with historical fingerprints of external environment conditions. At step 64, the currently sensed fingerprint is looked up in the index of historical fingerprints to determine if a match exists between current conditions and a historical condition. If no match is determined at step 64, the process continues to step 66 to discard the currently sensed conditions and then returns to step 60 to record the next moving window. If a match exists at step 64, the process continues to step 68, the actions associated with the historical fingerprint are predicted for the currently sensed conditions and the computer system responds by initiating the predicted inputs for the actions before the inputs are detected, such as by prefetching memory pages for the applications used in a tagged event.

Using the timeline of FIG. 2 as an example, an historical fingerprint is established that between 8:00 and 9:00 A.M. the microphone detects the sound of a key, the sound of a door opening and the sound of a light switch, and the camera detects a light turned on. This historical fingerprint is associated with the actions of logging in at the computer and swapping an email client, browser and music player to the foreground. Therefore, when current external environment conditions have a fingerprint that matches the stored fingerprint, the computer responds by prefetching the login panel and authentication application and by paging the email client, web browser and music player to main memory, even though the end user has not yet directly interacted with the computer input devices. As a result, by the time the end user sits at the computer and selects the predicted inputs, the login, email, browser and music respond promptly. In addition to performing innocuous, under-the-cover operations like memory paging, more foreground-oriented actions may be performed, such as initiating an predicted application that is not already running, triggering replication and transitioning the computer from a power down state, such as sleep and hibernate states, to an on state. Default actions may be configured by an end user so the computer responds in a desired manner to a predetermined external environment condition.

Although the present invention has been described in detail, it should be understood that various changes, substitutions and alterations can be made hereto without departing from the spirit and scope of the invention as defined by the appended claims.

What is claimed is:

1. A computer system comprising:
   a processor operable to execute instructions;
   volatile memory interfaced with the processor and operable to store the instructions in support of execution of the instructions by the processor;

non-volatile memory interfaced with the processor and operable to store the instructions in a powered down state;

a display interfaced with the processor and operable to present content generated by the instructions;

one or more input devices interfaced with the processor and operable to accept inputs from an end user;

firmware interfaced with the processor and operable to coordinate interaction between the processor, volatile memory, non-volatile memory, display, and one or more input devices;

one or more external environment sensors interfaced with the firmware, each external environment sensor operable to sense an external environment condition; and an input predictor interfaced with the one or more external environment sensors and operable to predict a future input to the one or more input devices based upon one or more external environment conditions sensed by the one or more external environment sensors, the future input comprising at least initiation of an application, the input predictor further operable to load instructions for executing the application from non-volatile memory to volatile memory for execution by the processor in response to the predicted input and to execute the instructions to initiate the application in response to prediction of the future input, wherein the input predictor comprises instructions running in the firmware and the external environment sensor comprises a microphone, the input predictor predicting an input to request power up of the processor from a sleep state to an on state based at least in part upon a sound captured by the microphone of keys unlocking a door.

2. The system of claim 1 wherein the external environment condition sensed by the external environment sensors comprises the sound of keys unlocking a door and the inputs made by a user at the input device comprise power up of the processor and execution of a predetermined application.

3. A system for prefetching content for presentation at a computer, the system comprising:

a processor to execute instructions;

memory storing the instructions, the instructions including:

an input tracker interfaced with plural external environment sensors and at least one input device, the input tracker operable to relate external environment conditions sensed by the external environment sensors in a relationship with inputs made by a user at the input device; and an input predictor interfaced with the input tracker, the input predictor operable to apply current external environment conditions sensed by the external environment sensors to the relationship of the input tracker to predict a future user input at the input device, and in response to the predicted future user input to execute an application associated with the future user input on the processor, to prefetch content associated with the application, to prepare the content for presentation as visual images at a display, and to withhold presentation of the visual images until detection of the future user input, wherein the external environment condition sensed by the external environment sensors comprises the sound of keys unlocking a door and the inputs made by a user at the input device comprise power up of the processor and execution of a predetermined application.

4. The system of claim 3 wherein the input predictor is further operable to power up the processor in response to detection of the sound of keys unlocking a door.

* * * * *